(12) United States Patent
Ko et al.

(10) Patent No.: US 11,647,090 B2
(45) Date of Patent: May 9, 2023

(54) SPATIO-COHESIVE SERVICE DISCOVERY AND DYNAMIC SERVICE HANDOVER FOR DISTRIBUTED IOT ENVIRONMENTS

(71) Applicant: Korea Advanced Institute of Science and Technology, Daejeon (KR)

(72) Inventors: In-Young Ko, Daejeon (KR); Kyeongdeok Baek, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/186,000

(22) Filed: Nov. 9, 2018

(65) Prior Publication Data
US 2019/0222655 A1    Jul. 18, 2019

(30) Foreign Application Priority Data

Jan. 15, 2018 (KR) .......................... 10-2018-0004863
Jul. 6, 2018 (KR) .......................... 10-2018-0078709

(51) Int. Cl.
*H04L 67/51* (2022.01)
*H04L 43/045* (2022.01)
(Continued)

(52) U.S. Cl.
CPC .......... *H04L 67/51* (2022.05); *H04L 41/0893* (2013.01); *H04L 41/5048* (2013.01); *H04L 41/5058* (2013.01); *H04L 43/045* (2013.01); *H04L 67/12* (2013.01); *H04L 67/52* (2022.05); *H04L 41/16* (2013.01)

(58) Field of Classification Search
CPC . H04L 67/16; H04L 41/0893; H04L 41/5048; H04L 41/5058; H04L 43/045; H04L 67/12; H04L 67/18; H04L 41/16
See application file for complete search history.

(56) References Cited

U.S. PATENT DOCUMENTS 7,480,627 B1 * 1/2009 Van Horn .......... G06Q 30/0641
                                                              705/28
9,432,465 B1 * 8/2016 Bjorkengren ........... H04L 67/51
(Continued)

FOREIGN PATENT DOCUMENTS

KR        10-1397471 B1    5/2014

OTHER PUBLICATIONS

Ko et al., Dynamic Discovery of Geographically Cohesive Services in Internet of Things Environments (2016), Journal of KIISE (Year: 2016).*

(Continued)

*Primary Examiner* — William G Trost, IV
*Assistant Examiner* — Abdelbasst Talioua
(74) *Attorney, Agent, or Firm* — Christensen O'Connor Johnson Kindness PLLC

(57) ABSTRACT

Spatio-cohesive service discovery and handover methods for distributed IoT environments are disclosed. The spatio-cohesive service discovery and handover methods include discovering a set of IoT (internet of thing) resources for providing a set of services which is a set of functionalities necessary for a task in distributed IoT environments, wherein the discovering a set of IoT resources may discover the set of IoT resources through a spatio-cohesive method considering spatial distance between a user and a service and between two services.

18 Claims, 11 Drawing Sheets

(51) Int. Cl.
*H04L 67/12* (2022.01)
*H04L 41/0893* (2022.01)
*H04L 41/50* (2022.01)
*H04L 41/5041* (2022.01)
*H04L 67/52* (2022.01)
*H04L 41/16* (2022.01)

(56) References Cited

U.S. PATENT DOCUMENTS

| | | | | |
|---|---|---|---|---|
| 9,716,675 | B2* | 7/2017 | Choi | H04L 51/02 |
| 10,235,226 | B1* | 3/2019 | Shekhar | H04L 45/306 |
| 2004/0054690 | A1* | 3/2004 | Hillerbrand | H04L 67/564 |
| 2004/0199613 | A1* | 10/2004 | Hundscheidt | H04L 12/1854 |
| | | | | 703/13 |
| 2004/0236826 | A1* | 11/2004 | Harville | H04L 65/1101 |
| | | | | 709/203 |
| 2006/0026008 | A1* | 2/2006 | Goetz | G06F 9/5044 |
| | | | | 705/1.1 |
| 2008/0248815 | A1* | 10/2008 | Busch | H04L 67/52 |
| | | | | 455/456.5 |
| 2009/0204612 | A1* | 8/2009 | Keshavarz-Nia | H04L 67/02 |
| 2011/0065376 | A1* | 3/2011 | Forutanpour | H04L 67/306 |
| | | | | 709/219 |
| 2013/0346347 | A1* | 12/2013 | Patterson | H04M 1/72454 |
| | | | | 706/12 |
| 2015/0195365 | A1* | 7/2015 | Choi | H04W 4/70 |
| | | | | 715/739 |
| 2016/0061933 | A1* | 3/2016 | Chung | G01S 5/0226 |
| | | | | 455/456.1 |
| 2016/0119435 | A1* | 4/2016 | Ben Fredj | H04L 67/51 |
| | | | | 370/310 |
| 2016/0285979 | A1* | 9/2016 | Wang | H04W 48/16 |
| 2016/0337804 | A1* | 11/2016 | Kim | H04W 4/33 |
| 2017/0094466 | A1* | 3/2017 | Bjorkengren | H04B 17/318 |
| 2017/0220963 | A1* | 8/2017 | Canaran | G06F 3/0484 |
| 2017/0222999 | A1* | 8/2017 | Banga | H04W 4/02 |
| 2017/0249839 | A1* | 8/2017 | Becker | G08G 1/096725 |
| 2017/0301148 | A1* | 10/2017 | Vinod | G07B 13/00 |
| 2017/0331906 | A1* | 11/2017 | Choi | H04L 41/14 |
| 2017/0332330 | A1* | 11/2017 | Dhandu | H04W 64/006 |
| 2018/0032399 | A1* | 2/2018 | Johnson | G06F 11/142 |
| 2018/0054748 | A1* | 2/2018 | Minato | H04W 52/0274 |
| 2018/0084369 | A1* | 3/2018 | Hou | H04W 4/40 |
| 2018/0093177 | A1* | 4/2018 | Tokubo | A63F 13/327 |
| 2018/0181722 | A1* | 6/2018 | Boland | G16H 40/67 |
| 2018/0220283 | A1* | 8/2018 | Condeixa | H04L 67/12 |
| 2018/0268440 | A1* | 9/2018 | Avegliano | G06Q 30/0261 |
| 2018/0278543 | A1* | 9/2018 | Gopalan | H04L 41/0806 |
| 2018/0295485 | A1* | 10/2018 | Jalkanen | H04W 12/106 |
| 2018/0367616 | A1* | 12/2018 | Yang | H04L 67/12 |
| 2018/0374020 | A1* | 12/2018 | Ahani | G06Q 10/1095 |
| 2018/0376417 | A1* | 12/2018 | Wang | H04W 52/0254 |
| 2019/0006891 | A1* | 1/2019 | Park | H04W 4/80 |
| 2019/0033084 | A1* | 1/2019 | Chen | G06Q 10/047 |
| 2019/0044949 | A1* | 2/2019 | Bartfai-Walcott | H04W 12/63 |
| 2019/0158416 | A1* | 5/2019 | Aronovich | G06F 9/5072 |
| 2019/0204097 | A1* | 7/2019 | Stams | G07C 5/008 |
| 2019/0205785 | A1* | 7/2019 | Volk | G06N 3/0454 |
| 2019/0253861 | A1* | 8/2019 | Horelik | H04W 76/50 |
| 2019/0320040 | A1* | 10/2019 | Kottapalli | H04L 67/12 |
| 2019/0349254 | A1* | 11/2019 | Nolan | H04W 12/106 |
| 2019/0349426 | A1* | 11/2019 | Smith | H04L 9/0825 |
| 2019/0364492 | A1* | 11/2019 | Azizi | H04W 48/16 |
| 2021/0203491 | A1* | 7/2021 | Wei | H04W 12/043 |
| 2022/0129903 | A1* | 4/2022 | Sambhar | G06Q 20/40145 |

OTHER PUBLICATIONS

Baek et al., "Dynamic Discovery of Geographically Cohesive Services in Internet of Things Environments", Journal of KIISE, vol. 43, No. 8, pp. 893-901, 2016, with English Abstract.

* cited by examiner

FIG. 4

| Name | Notation |
|---|---|
| Service set for task $T$ | $S_T$ |
| Time instance | $\tau_i \in TS$ |
| Network | $N(\tau) = (D \cup \{u\}, E(\tau))$ |
| Vertex position | $v.\text{coord}(\tau), v \in D \cup \{u\}$ |
| Capability of IoT resource $d$ | $d_{service}$ |
| User | $u$ |
| Connection | $(d_i, d_j) \text{ or } (u, d_i) \in E(\tau)$ |
| Spatio-cohesiveness requirement | $r_i = (m, n, l) \in R_T, \text{ for } m, n \in S_T \cup \{u\}$ |
| Candidate resource selection | $C(\tau) \subseteq 2^D$ |
| Spatio-cohesive resource selection | $c_{SC}(\tau) \in C(\tau)$ |

FIG. 6

Task(?t) ^hasTemplate(?t, ?tmpl)
^hasUser(?t, ?u) ^hasService(?tmpl, ?s)
^hasCategory(?s, Audio)
^hasProperty(?s, Volume)
^swrlb:lessThan(?v, 30)

→ hasRequirement(?t, ?req)
^hasServiceBoundary(?req, ?u)
^hasServiceBoundary(?req, ?s)
^hasLimitValue(?req, 5)

FIG. 8

| Algorithm 1. Spatio-cohesive Service Discovery Algorithm |
|---|

1: procedure SERVICEDISCOVERYTRIGGER(task $T$, service $S$)
2:     $nonChildSet = T.discoveryPlan$.nonChildOf($S$)
3:     for each service $nonChild$ in $nonChildSet$ do
4:         if isServiceDiscovered($nonChild$) and not isRequirementMeet($S$, $nonChild$) then
5:             ReDiscovery($T$, $S$)
6:             Return
7:         end if
8:     end for
9:     $childList = T.discoveryPlan$.childOf($S$)
10:     for each service $child$ in $childList$ do
11:         ServiceDiscovery($T$, $S$, $child$)
12:         if not $allowConcurrency$ then
13:             waitUntilFinished($child$)
14:         end if
15:     end for
16: end procedure
17:
18: procedure SERVICEDISCOVERY(task $T$, service $parent$, service $child$)
19:     $candidateSet$ = findCandidateSet($T$, isRequirementMeet, $parent$, $child$)
20:     if isEmpty($candidateSet$) then
21:         ReDiscovery($T$, $parent$)
22:     else
23:         $child$.setResource($candidateSet$.extractMin())
24:         ServiceDiscoveryTrigger($T$, $child$)
25:     end if
26: end procedure
27:
28: procedure REDISCOVERY(task $T$, service $S$)
29:     disableResource($S$.getResource())
30:     $T$.resetDiscoveryState($S$)
31:     $parent = T.discoveryPlan$.findParentOfService($S$)
32:     ServiceDiscovery($T$, $parent$, $S$)
33: end procedure

FIG. 9

| Algorithm 2. Algorithm to Find Candidate IoT Resources for a Service |
|---|
| 1: procedure FINDCANDIDATESET(task $T$, function condition, service *parent*, service *child*) |
| 2:     *candidateSet* = *emptySet* |
| 3:     *parent*.broadcastDiscoveryPacket(*child*) |
| 4:     while *time* < *delay* and *candidate* = getDiscoveryResponse() do |
| 5:         if condition($T$, *parent*, *candidate*) then |
| 6:             *candidateSet*.insert(*candidate*) |
| 7:         end if |
| 8:         if not *allowMultipleCandidates* then |
| 9:             break |
| 10:        end if |
| 11:    end while |
| 12:    Return *candidateSet* |
| 13: end procedure |

FIG. 10

| | |
|---|---|
| Algorithm 3. Dynamic Service Handover Algorithm | |
| 1: | procedure SERVICEHANDOVERTRIGGER(task $T$, service $S$) |
| 2: |    $nonChildSet = T.discoveryPlan$.nonChildOf($S$) |
| 3: |    for each service $nonChild$ in $nonChildSet$ do |
| 4: |       if not isRequirementMeet($S$, $nonChild$) then |
| 5: |          ServiceHandover($T$, $S$) |
| 6: |       end if |
| 7: |    end for |
| 8: |    $childList = T.discoveryPlan$.childOf($S$) |
| 9: |    for each service $child$ in $childList$ do |
| 10: |       ServiceHandover($T$, $child$) |
| 11: |       if not $allowConcurrency$ then |
| 12: |          waitUntilHandoverEnds($child$) |
| 13: |       end if |
| 14: |    end for |
| 15: | end procedure |
| 16: | |
| 17: | procedure SERVICEHANDOVER(task $T$, service $S$) |
| 18: |    $parent$ = findParentOfService($S$) |
| 19: |    $candidateSet$ = findCandidateSet($T$, handoverDecision, $parent$, $S$) |
| 20: |    if not isEmpty($candidateSet$) then |
| 21: |       $S$.setResource($candidateSet$.extractMin()) |
| 22: |    end if |
| 23: |    ServiceHandoverTrigger($T$, $S$) |
| 24: | end procedure |
| 25: | |
| 26: | procedure HANDOVERDECISION(task $T$, service $S$, resource $candidate$) |
| 27: |    $parent = T.discoveryPlan$.findParentOfService($S$) |
| 28: |    $req = T$.findRequirement($parent$, $S$) |
| 29: |    $currentResource = S$.getCurrentResource() |
| 30: |    $currentObj$ = getDistance($parent$, $currentResource$)/$req$.getLimit() |
| 31: |    $candidateObj$ = getDistance($parent$, $candidate$)/$req$.getLimit() |
| 32: |    Return $currentObj > threshold$ and $currentObj - margin > candidateObj$ |
| 33: | end procedure |

# SPATIO-COHESIVE SERVICE DISCOVERY AND DYNAMIC SERVICE HANDOVER FOR DISTRIBUTED IOT ENVIRONMENTS

This application claims the priority benefit of Korean Patent Application No. 10-2018-0004863, filed on Jan. 15, 2018, and Korean Patent Application No. 10-2018-0078709, filed on Jul. 6, 2018, in the Korean Intellectual Property Office, the disclosure of which is incorporated herein by reference.

BACKGROUND

1. Field of the Invention

The following example embodiments relate to a technology for discovering effectively and dynamically appropriate IoT (Internet of Things) services required for performing user task.

2. Description of the Related Art

As IoT technology is recently widely spread, various services using IoT resources are provided in an urban environment.

As an example of IoT technology, a technology for providing open IoT services is disclosed in Korean Patent No. 10-1397471 (Registration date May 14, 2014).

Although commercial IoT based system adopts cloud computing model to effectively manage IoT services, there is a limit in extendability of centralized cloud computing model because the number of IoT resources is rapidly increased.

SUMMARY

At least one example of embodiments may provide a method for discovering effectively and dynamically appropriate IoT services required for performing user task by using IoT resources locating cohesively a distance between services in the vicinity of a user in distributed IoT environments and a system therefor.

A method performed in a computer system includes discovering a set of IoT (internet of thing) resources for providing a set of services which is a set of functionalities necessary for a task in distributed IoT environments, wherein the discovering a set of IoT resources which discovers the set of IoT resources through a spatio-cohesive method considering spatial distance between a user and a service and between two services includes generating a service discovery plan based on spatio-cohesiveness requirements including a rule related to spatial distance; and discovering services necessary for the task based on the service discovery plan, but after discovering services meeting the spatio-cohesiveness requirements of the task, discovering other services maintaining spatio-cohesiveness with the discovered services.

According to at least one example of embodiments, the generating a service discovery plan may include extracting specified spatio-cohesiveness requirements for the task from a predefined task template.

According to another aspect of at least one example of embodiments, the spatio-cohesiveness requirements may be expressed based on ontology model and extracted by using a rule-based reasoning method.

According to another aspect of at least one example of embodiments, the generating a service discovery plan may include instantiating the service discovery plan on a graph by using discovery strategies guiding traversal after the spatio-cohesiveness requirements are represented in the graph abstracting spatial positions and relationship of services.

According to another aspect of at least one example of embodiments, the discovery strategies may be composed of a spanning tree algorithm for constructing a path for discovering a child service in a parent service and a service priority function for assigning a priority to each service based on their importance.

According to another aspect of at least one example of embodiments, the discovering a set of IoT resources may include discovering IoT resources necessary to realize the services related to the task by propagating a service discovery request to the child service from the parent service according to the service discovery plan instantiated on the graph.

According to another aspect of at least one example of embodiments, the discovering IoT resources may include selecting IoT resource with the closest spatial distance among candidate IoT resources after discovering the candidate IoT resources which may provide the child service for the parent service.

According to another aspect of at least one example of embodiments, the discovering a set of IoT resources may include handing over at least some services among the discovered services by monitoring spatio-cohesiveness status of the discovered services.

According to another aspect of at least one example of embodiments, the handing over may periodically check whether the IoT resources selected for the task meet the spatio-cohesiveness requirements, and convert IoT resources which do not meet the spatio-cohesiveness requirements to other IoT resources according to an objective function minimizing the number of IoT resources to be handed over during a set period.

According to another aspect of at least one example of embodiments, the discovering a set of IoT resources may include selecting services necessary for the task based on a policy learned through machine learning for available services by dynamic changes of IoT environments.

According to another aspect of at least one example of embodiments, the policy may be learned in a way of maximizing spatio-cohesiveness which is defined as a measure of how close spatial distance between the user and the service is and minimizing the number of hand-overs defined as a set difference between the previous and current set of selected services.

According to another aspect of at least one example of embodiments, the policy may be implemented as neural networks inputting a state vector representing coordinates and speed of the user, a state vector representing coordinates and speed of the service, and a relationship vector representing relative position and speed between the user and the service.

A method performed in a computer system includes discovering a set of IoT resources for providing a set of services which is a set of functionalities necessary for a task in distributed IoT environments, wherein the discovering a set of IoT resources includes extracting spatio-cohesiveness requirements related to spatial distance between a user and a service and between two services; generating a service discovery plan by instantiating on a graph by using discovery strategies guiding traversal after the spatio-cohesiveness requirements are represented in the graph abstracting spatial positions and relationship of services; and discovering IoT resources necessary to realize the services related to the task by propagating a service discovery request to a child service from a parent service according to the service discovery plan.

A computer system includes at least one processor implemented to execute computer readable instructions, wherein the at least one processor processes a process for discovering a set of IoT resources for providing a set of services which is a set of functionalities necessary for a task in distributed IoT environments, wherein the process for discovering a set of IoT resources which discovers the set of IoT resources through a spatio-cohesive method considering spatial distance between a user and a service, and between two services includes a process for generating a service discovery plan based on spatio-cohesiveness requirements including a rule related to spatial distance, and a process for discovering services necessary for the task based on the service discovery plan, but after discovering services meeting the spatio-cohesiveness requirements of the task, discovering other services maintaining spatio-cohesiveness with the discovered services.

According to example embodiments, available services engaged with an IoT device may be discovered for being provided a service needed by a user in distributed IoT environments, and services in use may be handed over to an IoT device within range that the service may be physically provided to the user while the user is on the move.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 4 illustrates a table arranging notations according to an example of embodiments;

FIG. 6 illustrates an example of rule represented in SWRL (Semantic Web Rule Language) according to an example of embodiments;

FIG. 8 illustrates an algorithm representing spatio-cohesive service discovery process according to an example of embodiments;

FIG. 9 illustrates an algorithm representing candidate IoT resources discovery process according to an example of embodiments;

FIG. 10 illustrates an algorithm representing dynamic service handover process according to an example of embodiments;

DETAILED DESCRIPTION

Hereinafter, some example embodiments will be described in detail with reference to the accompanying drawings.

As the number of IoT resources is recently rapidly increased, a distributed computing model based on MANET (Mobile Ad-hoc Network) is applied.

Figure 1:
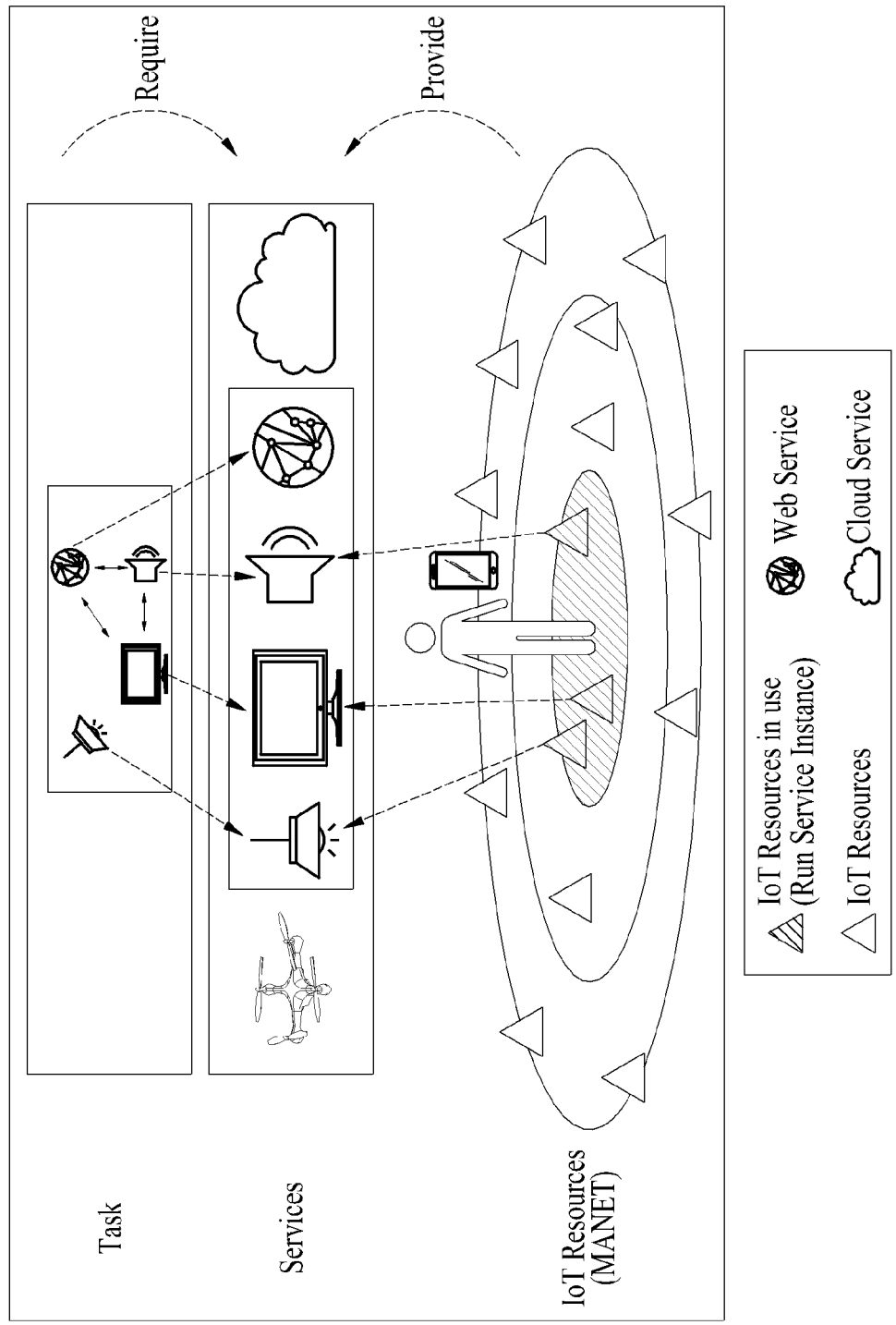
FIG. 1 illustrates an example of a distributed IoT environment using MANET (Mobile Ad-hoc Network) according to an example of embodiments.

FIG. 1 illustrates an example of distributed IoT environment using MANET (Mobile Ad-hoc Network) according to an example of embodiments.

Referring to FIG. 1, IoT resources may directly access through MANET in a distributed IoT environment. The MANET allows for IoT resources to interact with each other in order to provide services to users in a more efficient and flexible manner without the need to deploy infrastructure. In addition, composite services may be developed by integrating IoT and other types of services such as Web and cloud services together to accomplish user task.

For user-centric provision of IoT services, a task-based service provision framework is developed. In this framework, a task is a description of a user's demand and entails the services required to provide necessary functionalities. A service defines a set of functionalities that are necessary to support an activity for a user task. A service is realized through a service instance that requires a set of resources, which are IoT devices that provide certain primitive functionalities.

In the present invention, it is assumed that IoT resources have enough computational power and networking capabilities to form a MANET without any infrastructure, and if an IoT resource is constrained by limited computation or networking capabilities, a service gateway may be used to enable the resource to join a MANET.

Such a distributed IoT environment, however, raises a new challenge to efficiently and dynamically discovering appropriate IoT resources. In other words, a new problem is providing necessary IoT services to accomplish a user task, in the vicinity of the user. To address this issue, several studies have been undertaken in the service-oriented architecture and Web services domains. In particular, mobility, location dependency, and composability of distributed services have been considered as important issues to address to enable effective service provision in practical IoT environments. First, owing to mobility of users and IoT resources, the availability of IoT services frequently changes. Therefore, a discovery algorithm needs to dynamically discover valid IoT services that are necessary to perform user tasks. Second, unlike traditional Web services, the spatial location of a user and IoT resources affects the effectiveness of delivering IoT services to users. To deliver the outputs of IoT services to a user in an effective and efficient manner, corresponding IoT resources need to be located close to the user. Third, various services in an IoT environment need to coordinate with each other to perform complex user tasks, and therefore, cooperative IoT resources need to be located cohesively in a space where the user is located.

In the present invention, spatio-cohesive services are defined as services that utilize IoT resources that are located cohesively in a user's vicinity with the distance among the services short enough such that the outcome of the service coordination may be effectively delivered to the user. The spatio-cohesiveness of IoT services is a critical factor to maximize QoE (Quality of user Experience) of a user task. When degradation of spatio-cohesiveness of IoT services is detected, some of the services need to be replaced with alternative ones in the MANET so that a certain degree of spatio-cohesiveness that is required by a user task may be ensured.

Therefore, in the present invention, a spatio-cohesive service discovery and handover method for ad-hoc IoT environments, where spatio-cohesiveness of IoT services is essential to perform a user task with high QoE is proposed.

The spatio-cohesive service discovery and handover method consist of two phases. In the first phase, a service discovery plan is generated, which is a systematic plan for discovering services that may be coordinated together to accomplish a user task. In this phase, various service discovery strategies such as a spanning tree algorithm and a service priority function are considered to generate the most effective discovery plan.

In the second phase, spatio-cohesive services are discovered and handed over using the service discovery plan generated in the first phase. The spatio-cohesive service discovery algorithm first discovers a core set of services that meet the spatio-cohesiveness requirements of a task for the user, and then incrementally discovers other service while ensuring that the services are spatially cohesive with the services that have already been discovered. In addition, the dynamic service handover algorithm monitors the spatio-cohesiveness status of the services and performs handover when some of the services are beyond the requirement boundary.

Hereinafter, a particular example of embodiments for the spatio-cohesive service discovery and handover in the distributed IoT environment will be described.

Figure 2:
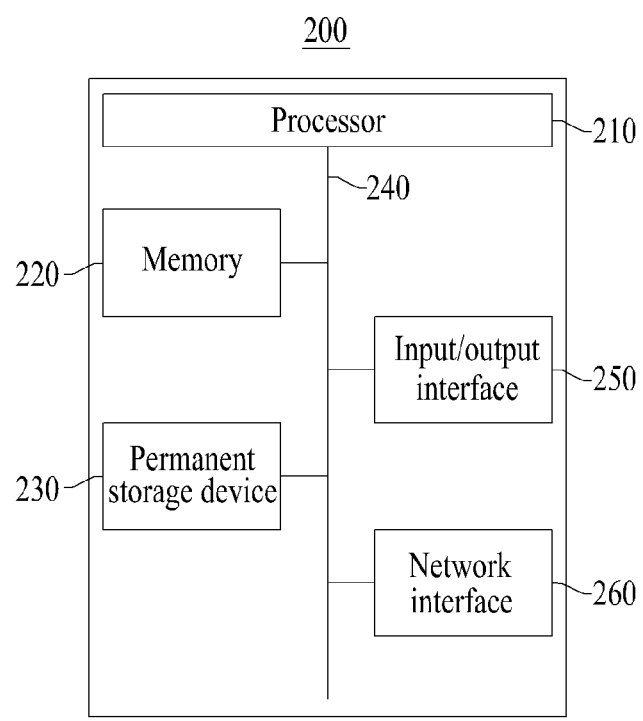
FIG. 2 is a block diagram illustrating an example of an internal configuration of a computer system according to an example of embodiments.

FIG. 2 is a block diagram illustrating an example of an internal configuration of a computer system according to an example of embodiments.

An IoT service system according to an example of embodiments may be implemented through a computer system 200 of FIG. 2. As illustrated in FIG. 2, the computer system 200 may include a processor 210, a memory 220, a permanent storage device 230, a bus 240, an input/output interface 250, and a network interface 260 as components to execute the spatio-cohesive service discovery and handover method.

The processor 210 may include or be the part of any device which may process sequences of commands. The processor 210 may include, for example, a computer processor, a processor in a transport device or another electronic device and/or a digital processor. For example, the processor 210 may be included in a server computing device, a server computer, a group of server computers, a server farm, a cloud computer, a content platform, a transport computing device, a smartphone, a tablet, a set top box, and the like. The processor 210 may be accessed to the memory 220 through the bus 240.

The memory 220 may include a volatile memory, permanent, virtual or another memory for storing information used by the computer system 200 or outputted thereby. For example, the memory 220 may include RAM (Random Access Memory) and/or DRAM (Dynamic RAM). The memory may be used to store any information such as state information of the computer system 200. For example, the memory 220 may be used to store commands of the computer system 200 including commands for controlling IoT services. The computer system 200 may include one or more processor 210 as needed or in appropriate case.

The bus 240 may include communication infrastructure which allow interaction between various components of the computer system 200. The bus 240 may carry data between components of the computer system 200, for example, between the processor 210 and the memory 220. The bus 240 may include wireless and/ or wire communication media between components of the computer system 200, and may include parallel, series or other topology arrangements.

The permanent storage device 230 may include memory as used by the computer system 200 or components such as other permanent storage devices to store data for a predetermined extended period (e.g., comparing with the memory 220). The permanent storage device 230 may include non-volatile main memory as used by the processor 210 of the computer system 200. For example, the permanent storage device 230 may include a flash memory, a hard disk, an optical disk, or other computer-readable media.

The input/output interface 250 may include a keyboard, a mouse, a microphone, a camera, a display, or interfaces for other input or output devices. Configuration commands and/or inputs relating to IoT services may be received through the input/output interface 250.

The network interface 260 may include one or more interfaces for networks such as Local Area Network or Internet. The network interface 260 may include interfaces for wire or wireless accesses. Configuration commands may be received through the network interface 260. In addition, information relating to IoT services may be received or transmitted through the network interface 260.

Also, in other example embodiments, the computer system 200 may include more components than the components of FIG. 2. However, most conventional technical components don't need to be clearly illustrated. For example, the computer system 200 may be implemented to include at least part of the input/output devices connected with the described input/output interface 250 or may further include other components such as a transceiver, a GPS (Global Positioning System) module, a camera, various sensors, a database, and the like. As more particular example, when the computer system 200 is implemented in a form of a mobile device such as a smartphone, it may be implemented that the computer system 200 further includes various components such as a camera, an acceleration sensor or gyro sensor, a camera, various physical buttons, buttons using touch panel, an input/output port, a vibrator for vibration, and the like which are generally included in the mobile device Service discovery in service computing environments may be classified into proactive and reactive service discovery. Reactive service discovery algorithms discover services according to a user's request, and in distributed IoT environments, it is necessary to discover services in a reactive manner according to the requirements of user tasks because of scalability. Furthermore, in IoT environments, a service discovery often requires the discovery of IoT resources that are necessary to provide the service. Therefore, service discovery in the present invention is closely associated with the discovery of the required IoT resources. In particular, the service discovery process in IoT environments includes the selection of the best IoT resources among candidate resources that may provide required services.

Figure 3:
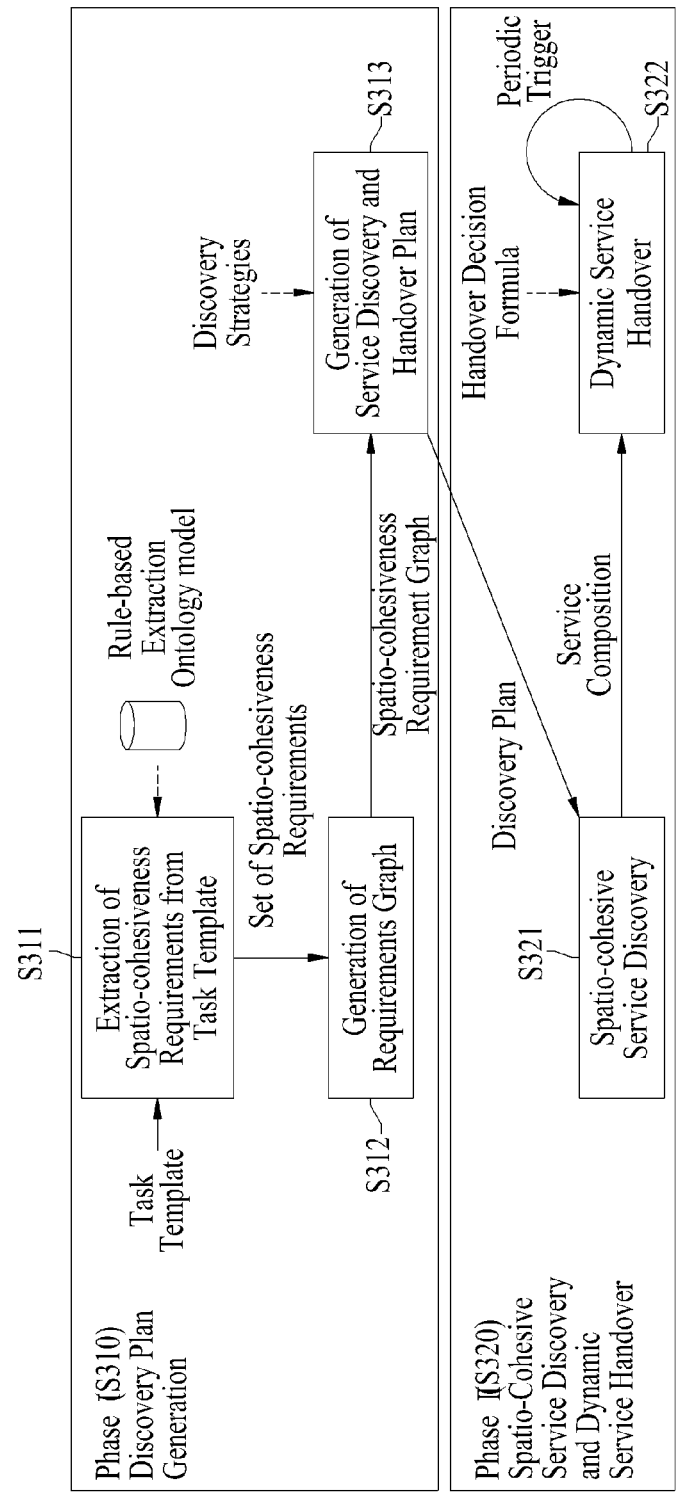
FIG. 3 is a flow chart illustrating spatio-cohesive method and hand over method which computer system may perform according to an example of embodiments.

FIG. 3 is a flow chart illustrating spatio-cohesive method and hand over method which computer system may perform according to an example of embodiment.

The processor 210 may perform phases S310 and S320 that the spatio-cohesiveness discovery and handover method includes. For example, the processor 210 may be implemented to execute instruction according to a code of an operating system that the memory 220 includes and the described at least one program code. Here, the at least one program code may correspond to a program code implemented to process the spatio-cohesive discovery and handover method.

FIG. 3 represents main phases and overall process of the spatio-cohesive service discovery and dynamic service handover algorithms. In the first phase S310, the spatio-cohesiveness requirements are extracted S311 and a plan for the service discovery and handover is generated based on the spatio-cohesiveness requirements S312 and S313. A spatio-cohesiveness requirement is a locational dependency between two services or between a user and a service, which should be located cohesively to each other. After the extraction, the requirements are represented in a graph, and the service discovery plan is instantiated on the graph, using various discovery strategies that guide traversal on the graph. In the second phase S320, IoT services for a user task in an IoT environment are discovered in a spatially cohesive manner based on the service discovery plan generated in the phase S310-S321. In the second phase S320, spatio-cohesive services for the user task in IoT environments are discovered by using the service discovery plan generated in the first phase S310. In the second phase S320, the dynamic service handover step S322 is periodically activated to monitor any changes in the spatio-cohesiveness requirements of the services, and to dynamically hand over some of the service instances that are not spatially cohesive to other services into alternative ones.

The spatio-cohesive service discovery and dynamic service handover problem is defined formally as follows.

For a given task T, the spatio-cohesive service discovery and dynamic service handover problem is to find a proper set of IoT resources D which are necessary to provide a set of required services $S_T$ of the task T. Each service B∈ST has its own service description dess that contains the information about the required capabilities and constraints. A time series TS which is a sequence of time instance $\tau_i$ indicates a topology change of the MANET. Time instance $\tau_0$ represents the time when the task starts its execution. The MANET at time $\tau$ is represented as a graph, $N(\tau)=(D \cup \{u\}, E(\tau))$. The vertices of the graph include the set of IoT resources D which provide capabilities for services and a user u that consumes the services. Each vertex v has function v.coord($\tau$) that returns the physical coordinate of the node at time $\tau$. A service that may be provided by utilizing an IoT resource d∈D is represented as $d_{service}$. An edge set of the network at time $\tau$ is defined as $E(\tau)$ where $E(\tau)$ is a set of direct links that forms MANET among IoT resources and user. The elements of $E(\tau)$ change as the connections among the IoT resources and user change because of the mobility.

It is assumed that there is only one user consuming the services in the IoT environment. The present invention focuses on service discovery for user tasks in a spatially cohesive manner.

A spatio-cohesiveness requirement is defined as (m, n, l) where m and n are a service or a user (i.e., m,n∈$S_T \cup \{u\}$), and they need to be located spatially close to each other within an upper limit, l. $R_T$ is a set of spatio-cohesiveness requirements for a task T that may be automatically extracted from the service descriptions in the task template. In addition, spatio-cohesiveness requirement may be extracted from a user preference or may be manually provided by a user.

The above described notations are summarized as FIG. 3.

In the present invention, the problem is to find the spatio-cohesive solution $c_{SC}(\tau) \in C(\tau)$. Here, $C(\tau) \subseteq 2^D$ is a set of candidate IoT resources that provide the services of the task at time $\tau$. The spatial distance between the resources that provide the services in each service pair (services m and n), or between a resource that provides a service m and the user n of set c is defined as function distance$_c$(m,n), and needs to be minimized for each spatio-cohesiveness requirement of the task. Moreover, achievement of the requirement is the ratio of distance and limit value, and will be 0 if distance exceeds the limit. Thus, measurement of the achievement of a spatio-cohesiveness requirement $r_i(c)$ with a candidate IoT resource set c may be measured as Equation 1.

$$r_i(c) = \max(1 - \text{distance}_c(r_i.m.\text{coord}(\tau), r_i.n.\text{coord}(\tau))/r_i.l, 0) \quad \text{[Equation 1]}$$

In addition, according to the definition of the connectivity of a network, the spatio-cohesiveness of a candidate set of IoT resources may be measured as the average of the minimum distance of a service that causes failure to one of its spatio-cohesiveness requirements. Therefore, the spatio-cohesiveness objective function $R_T(c)$ of a candidate resource set c may be defined as Equation 2.

$$R_T(c) = \Sigma_{s \in S_T, u} \min_{r_i=(s,s_k,l) \in R_T}(r_i(c))/|S_T \cup \{u\}| \quad \text{[Equation 2]}$$

The spatio-cohesiveness of a candidate IoT resource set is a value between zero and one. A low value indicates that there are many failures of meeting the requirements by IoT resources, while a high value indicates that most of the spatio-cohesiveness requirements are strongly achieved by the resources.

The spatio-cohesive service discovery problem is to find a set of resources that provide the spatio-cohesive services at the initial time $c_{SC}(\tau_0)$, and the dynamic service handover problem is to find a new set of resources that provide spatio-cohesive services when there is a change in the IoT MANET, i.e., $c_{SC}(\tau_i)(i>0)$. Furthermore, the dynamic service handover problem has an additional object function handover($c(\tau_{i-1}), c(\tau_i)$) which is for identifying the number of handovers from $c(\tau_{i-1})$ to $c(\tau_i)$. The objective function for service handover may be defined as Equation 3.

$$\text{handover}(c(\tau_{i-1}), c(\tau_i)) = |c(\tau_i) - c(\tau_{i-1})| \quad \text{[Equation 3]}$$

By minimizing the number of IoT resources to be handed over, the overhead of service handovers in accordance with the changes in the IoT MANET may be reduced. Therefore, the following defines the problem of finding spatio-cohesive services for a user task, while minimizing service handover cost throughout the lifecycle of the task (Equation 4).

$$c_{SC}(\tau_i) = \begin{cases} \min_{c \in C(\tau_i)}(R_T(c)) & (i=0) \\ \min_{c \in C(\tau_i)}(R_T(c), \text{handover}(c(\tau_i) - c_{SC}(\tau_{i-1}))) & (i>0) \end{cases} \quad \text{[Equation 4]}$$

Because there are multiple objective functions for each spatio-cohesiveness requirement with some constraints, this problem is a constrained multi-objective optimization problem. To check if the objective functions included in $R_T(c)$ are conflicting with each other, an IoT resource $d_i$ selected for the task is considered. The discovery algorithm searches for IoT resources that necessary to provide the services that are spatially cohesive to the services of $d_i$. If it is assumed that all the resources and the user are distributed over the MANET randomly and uniformly, the resources are expected to be distributed in all directions from $d_i$. Therefore, choosing an alternative resource $d'_i$ instead of $d_i$ will make one of the spatio-cohesiveness requirement achievement decrease, while making another requirement achievement increase.

Discovery Plan Generation S310

A process for extracting the spatio-cohesiveness requirements S311 is as follows.

Figure 5:
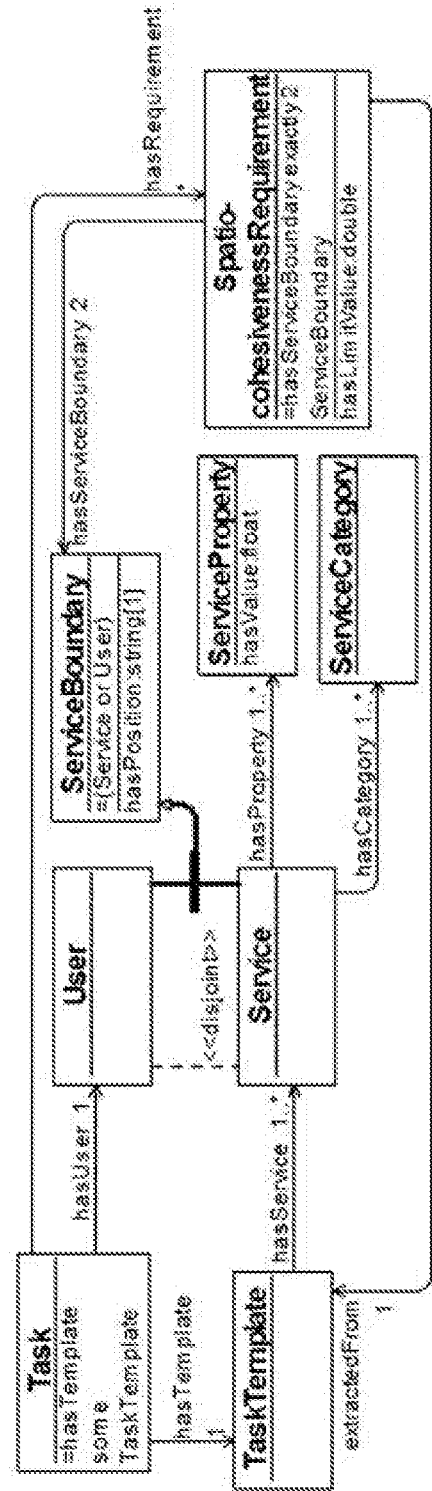
FIG. 5 illustrates an example of ontology model representing spatio-cohesiveness requirements according to an example of embodiments.

Studies on representing the functionality and the QoS of Web services semantically (Chen, X., et al.: Web service recommendation via exploiting location and QoS information. IEEE Trans. Parallel Distrib. Syst. 25(7), 1913-1924 (2014), Ma, Q., et al.: A semantic QoS-aware discovery framework for web services. In: IEEE International Conference on Web Services, ICWS 2008 (2008)) show that it is possible to infer the QoS requirements of a service in a semantic manner based on the semantic descriptions of the service. Similarly, the spatio-cohesiveness requirements of a user task may be extracted automatically from a task template. Therefore, as shown in FIG. 5, a brief ontology model to represent the spatio-cohesiveness requirements of a user task is defined. The ontology model is developed using OWL (Web Ontology Language) and represented as a UML (Unified Modeling Language class diagram). As illustrated in FIG. 5, a task has its own task template, which is composed of multiple services. A service may have some service properties representing the quality attributes and constraints of the service. In addition, a service may be classified into one or more service category. The services of a task and the user of the task may be combined to form a task boundary, by which a spatio-cohesiveness requirement may be specified for the task. Finally, a set of spatio-cohesiveness requirements are extracted from task template.

Spatio-cohesiveness requirements that are represented based on the ontology model may be extracted using a rule-based reasoning method. FIG. 6 shows an example rule represented in SWRL (Semantic Web Rule Language). For example, SWRL rule states that if a task requires an audio service with volume property less than 30 dB, the distance between the user and the audio service should be less than 5 m.

A process for generating spatio-cohesiveness requirement graph S312 is as follows.

In the method proposed in the present invention, the spatio-cohesiveness requirements is represented as a graph called a SCRG (Spatio-Cohesiveness Requirement Graph), in which the user and services are represented as vertices $S_T \cup \{u\}$, and the spatio-cohesiveness requirements among them are represented as edges $R_T$. The vertex that represents a user is defined as the root of a SCRG. The label on each edge represents the upper limit of spatio-cohesiveness requirement. The requirement graph is an abstraction of spatial positions and relationship of services. This graph does not represent the functional dependencies among services. In the present invention, it is assumed that the user and all services in a SCRG are connected.

A process for generating a discovery plan S313 is as follows.

On the basis of the SCRG generated in the previous stage S312, a service discovery plan to discover services in a systematic manner is made. A service discovery plan for a task T is defined as Defined Equation 1.

$$P_T = (child_P, nonChild_P)$$ [Defined Equation 1]

Figure 7:
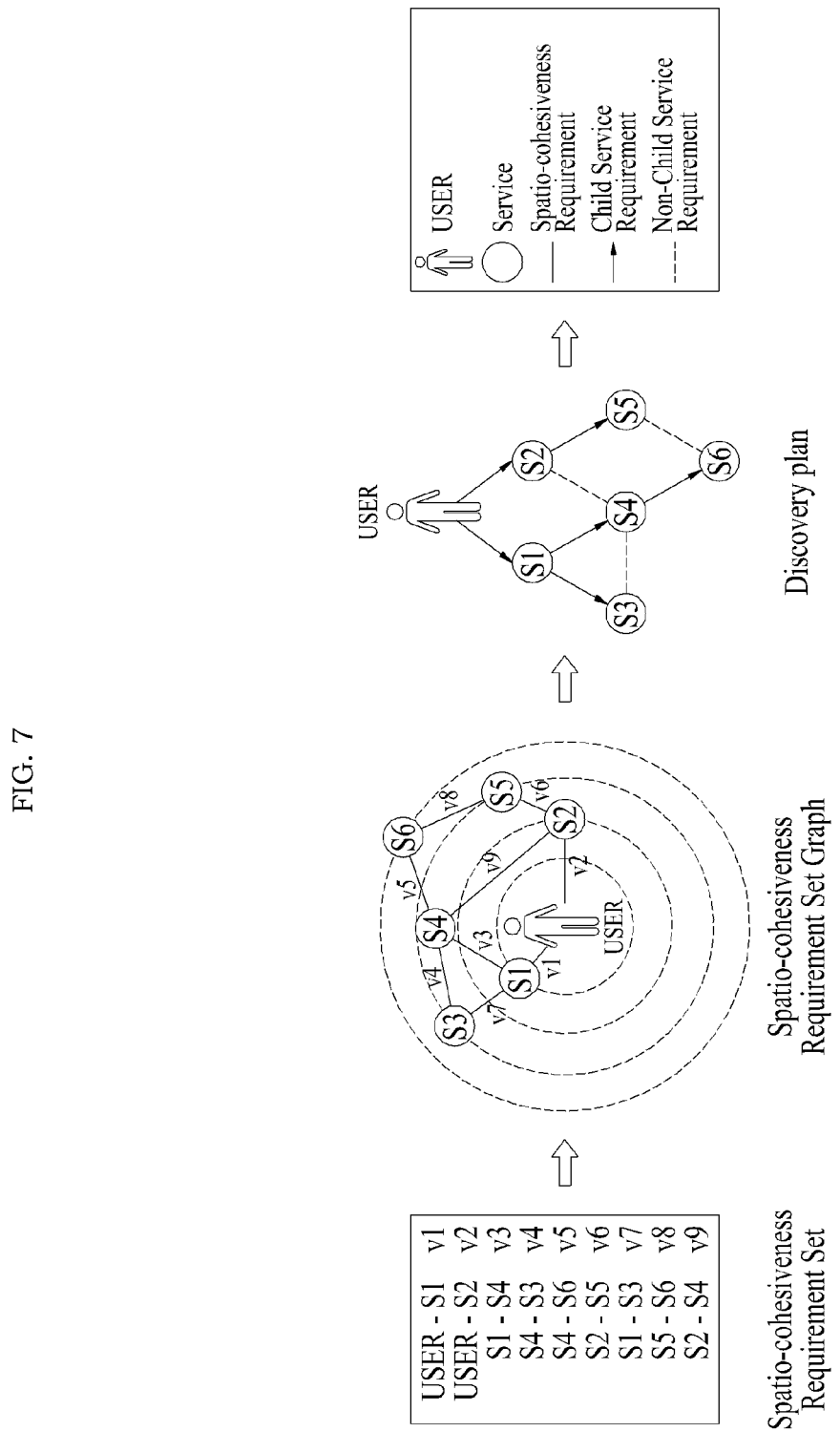
FIG. 7 illustrates an example of generation of a service discovery plan according to an example of embodiments.

In Defined Equation 1, childp is a subset of the spatio-cohesiveness requirements, and indicates the path in the requirement graph to discover a set of child services from its parent service. nonchildp is a complementary set of childp. Therefore, the IoT resource that is selected for a service S is evaluated as to whether it meets the spatio-cohesiveness requirements of nonchildp. Then, in accordance with the childp, the child services for the service S are discovered in vicinity of the selected resource of S. FIG. 7 shows an example of generation of a service discovery plan from a SCRG.

Generation of the childp set is done by constructing a spanning tree of the SCRG. Therefore, in the present invention, a service discovery strategy is composed of a spanning tree algorithm and a service priority function. The spanning tree algorithm is for constructing the childp, and the service priority function is for assigning a priority to each service based on their importance. This allows an algorithm to discover high-priority services effectively among child services of a service. Various spanning tree algorithms, such as DFS (Depth-First Search), BFS (Breadth-First Search), and MST (Minimum Spanning Tree), may be used. For the service priority function, an algorithm may be used to calculate the centrality of a service in the requirement graph, which is a well-known indicator of a vertex's importance in the graph, or a requirement boundary from a service node to its parent service for strict prioritization.

Spatio-Cohesive Service Discovery and Handover S320

A process for spatio-cohesive service discovery S321 is as follows. Based on the service discovery plan built in the previous state S313, the spatio-cohesive service discovery algorithm finds the IoT resources necessary to realize the services of a user task from the child services of the user node. Then, discovered services recursively finds the resources for the child services. For each resource, service discovery agent is deployed that allows discovery of child services in vicinity of the resource, as user requests. By the service discovery agent, user requests the resource of discovered service to discover its child services in vicinity of parent service. Therefore, service discovery request is propagated from parent service to child service, according to discovery plan.

During the service discovery process, for a service, there may be no available resource for its child service that meets the spatio-cohesiveness requirement. In this case, the algorithm re-discovers the resource of the parent service recursively until the service discovery of the parent service to its child service is successfully performed.

In the spatio-cohesive service discovery algorithm, there are two options that enable concurrent discovery of services, and the finding of multiple candidate resources for a service. Using these options, it is possible to make an efficient tradeoff between the failure rate and service discovery latency according to the conditions of the environment such as the dynamic level, and the density of the deployed services.

FIG. 8 represents Algorithm 1 for spatio-cohesive service discovery.

Algorithm 1 shows the spatio-cohesive service discovery algorithm that is executed for each discovered service recursively. The service discovery is initially triggered by a user, and propagated to IoT resources. The inputs to the algorithm are a task T which includes own template, and a set of services $S_T$ that need to be discovered for the task. A service discovery plan that is generated for the task is extracted from the task template, and the non-child services of the service to check the spatio-cohesiveness requirement are found based on the plan (Lines 2-3). For each non-child service, if it is already discovered and does not meet the requirement, the resource tries to discover the service of itself again from its parent (Lines 4-9). For simplicity, during the rediscovery of a service, current resource of the service is disabled, and an alternative resource is discovered (Lines 29-34). This makes the failed resource invisible in the further process. If all the spatio-cohesiveness requirements of the non-child services are met, service discovery agent of the resource starts discovering child services of its associated service (Lines 10-16). Discovery of a child service is achieved by finding a set of candidate resources that may realize the child service in the vicinity of its parent service (Line 20). After a set of candidate resources is discovered, the resource selects the closet resource that may provide the child service, and starts discovery process from selected resource (Lines 23-26). If no available candidate resource is found for a child service, the resource tries to discover the parent service again (Lines 21-22). In addition, if the option is not allowed to discover the child services concurrently, it waits until the previous discovery session finishes, then proceeds to discovery of the next (Lines 13-15).

FIG.9 represents Algorithm 2 for finding a set of candidate IoT resources.

Algorithm 2 is for finding a set of candidate IoT resources by service discovery agent of the resource. The corresponding resource broadcasts the request of the child service (Line 3), and then it finds candidates based on the replies from other resources (Lines 4-10). If a replied resource may be used to provide a required child service and meets the spatio-cohesiveness requirement, the service discovery agent adds the resource to the candidate set (Lines 4-7). If the option is not allowed to find multiple candidate resources, it returns the candidate resource that is found first (Lines 8-10).

A process for dynamic service handover S322 is as follows.

The major difference between the traditional handover and the service handover in an IoT environment is that the service handover requires consideration of a set of services to perform a user task, while the traditional handover considers only a single access point. Moreover, it is necessary to consider not only the case of handing over between a user's mobile device and a resource, but also the case of handing over between resources. In the present invention, the service discovery plan generated for a user task is utilized to perform service handover in a dynamic manner.

FIG. 10 represents Algorithm 3 for dynamic service handover.

Algorithm 3 has a structure similar to that of Algorithm 1. The service handover is triggered by a user periodically to check whether the resources selected for a task meet the spatio-cohesiveness requirements, and propagated to services similar with the service discovery algorithm. When handover process is triggered at a service by its parent service, associated service discovery agent on the resource finds a set of candidate resources for its child services by using a handover decision rule with hysteresis margin and threshold (Lines 27-34). The handover decision rule calculates the spatio-cohesiveness between resource of the parent service and the candidate resource, and between resource of the parent service and the current resource, according to the spatio-cohesiveness requirement of the parent service and the child service. Unlike the service discovery algorithm, empty candidate set indicates that there is no better resource available for the child service in the vicinity of the parent service.

When a lot of IoT devices are distributed in public IoT environment of city size, a process for discovering available services engaged with IoT devices is needed for being provided a service needed by a user. In the present invention, it is provided that physical effects of IoT devices, e.g., actuators such as a display or audio and the like, should be spatially located in the vicinity of a user to provide the effects to the user, and a service discovery algorithm allows to achieve scalability by discovering IoT devices that are close to the user in order and for IoT devices effectively to communicate with each other by locating the IoT devices which are discovered by the user in close. Also, it is needed to hand over a service to an IoT device which is within a range that the service is physically provided to the user in order that the service being used by the user is consistently performed on the move. Accordingly, in the present invention, handover technologies existing in a general network environment are extended in IoT service perspective, and a handover algorithm in which IoT service may be continuously performed after the user discovers the service is provided.

Therefore, IoT services may be discovered in surrounding environment of the user through a spatially cohesive manner to efficiently perform interaction between services and effectively hand over the service coordinate result to the user, and the service may be provided in a stable manner when degradation for spatio-cohesiveness is monitored through service handover method converting any one of IoT resources to another IoT resource to achieve QoE level for user task.

In an example of embodiments, selection of a child service from a parent service is a method selecting an IoT resource having the nearest spatial distance among discovered candidate IoT resources. In this case, because only current spatio-cohesive status of IoT environment is considered, there may be a limit in effective selection of resources.

In another example of embodiments, best IoT resource may be selected through machine learning predictively considering future status, in addition to current status.

Figure 11:
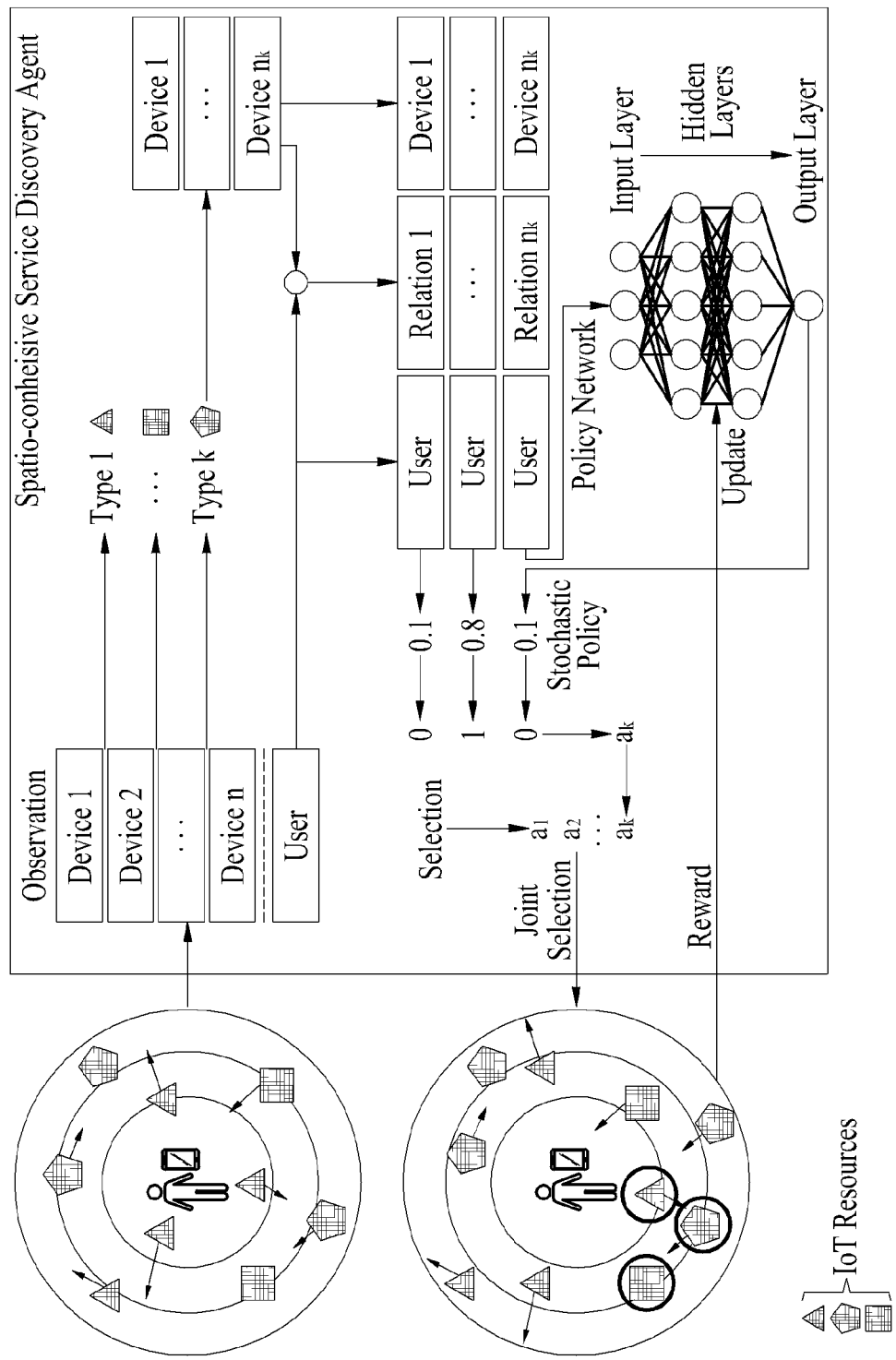
FIG. 11 illustrates a machine learning based service discovery agent according to an example of embodiments.

FIG. 11 illustrates a machine learning based service discovery agent.

A service discovery agent is worked in a mobile device of a user, and discovers available IoT resources, i.e., service providers, in the surrounding area with the user as the center. It is assumed that the discovered IoT resources are classified by each type of services, and the fixed number of types of services is present.

The agent performs service selection by applying a policy which is learned through machine learning for each type of services required by the user. The policy is implemented and represented with neural networks. Through such policy, the combination of selection performed for each service type is defined as action that the agent performs at the time. After the action performed in IoT environment, the agent receives an evaluation for the action in a form of reward, and learns the policy to maximize the reward. In the present invention, the reward may be defined through spatio-cohesiveness of the selected services and the number of hand-overs.

Spatio-cohesiveness service discovery problem is defined as a form of POMDP (Partial-Observable Markov Decision Process) to apply the machine learning.

POMDP is an extension of MDP (Markov Decision Process) in which observation is partially performed for IoT environment. POMDP is defined as 5 elements, as follows.

(1) State is defined as a set of states that IoT environment may have.

(2) Action is defined as a set of actions that an agent may take in IoT environment, and IoT environment transits from current state to another state by being affected by the action.

(3) Observation is defined as a function providing partial observation for current state of IoT environment to an agent.

(4) Transmission function is defined as a function indicating the probability of transition to another state when an agent takes any action in any state.

(5) Reward is defined as a function indicating reward value which reinforces or discourages an action when transition of state is generated by the action of an agent.

POMDP Definition

IoT environment is defined as a two-dimensional space where a number of IoT devices are deployed as service providers, and there is a user agent that wants to perform a task by utilizing the services in the environment. In this problem definition, IoT devices and user agents is defined as objects. Also, it is assumed that each object knows its coordinate and velocity in the space as a property. In addition, states of objects are defined to define state of IoT environment, and defined as coordinate, speed, and service type. The aggregation of the states of objects becomes the state of current environment.

In spatio-cohesive problem, the user agent has partial-observability based on Euclidean distances between objects, so the user agent may discover and use services located in close distance in IoT environment.

The action of the agent is defined as selecting one service provider among the candidates for each service type. The number of available candidate services, i.e., the number of possible actions, keeps changing by dynamic change of IoT environment, and accordingly, in the present invention, the policy gradient method among the machine learning methods which is known to be more robust to deal with this situation may be used.

In the present invention, two reward metrics, spatio-cohesiveness and the number of hand-overs are defined. First, spatio-cohesiveness is defined as a metric measuring how close a user and selected services are in a space, and the number of hand-overs is defined as a set difference between the previous and current set of selected service. The number of hand-overs is subtracted from spatio-cohesiveness to make a single final reward value, and it is learned in a way of maximizing spatio-cohesiveness and minimizing the number of hand-overs.

Service Discovery Agent

A service discovery agent maintains stochastic politics for each service type required by a user, and indicates probabilities to select a service provider discovered as each candidate. Joint probability is obtained by multiplying probability functions for each service type, and this is joint policy that the agent has for whole services. It is assumed that selection performed for each service type is independent in this process.

The policy may be represented with a parameter in a form of FFNN (Feed-Forward Neural Network) which is one of methods suitable to represent the stochastic policy. For each discovered candidate service provider, the agent uses state vector of candidate service, state vector of user, and relationship vector between them as an input of policy. Here, the relationship vector is obtained by reducing state vectors of user and candidate service, which represent the relative position and speed of the user and candidate service. When output value is obtained by the policy represented with neural network, the value takes softmax function, and then, is used as a probability value to select each candidate service.

To train service discovery agent, machine learning of known algorithms may be used, and for example, service discovery agent may be learned by using actor-critic algorithm.

Therefore, the example embodiments may select services considering future state with the current state according to learned policy for IoT environment through machine learning in a process for discovering services required for task in IoT environment.

The units described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The method according to the example embodiments may be implemented in a form of program instruction which may performed through various computer means and recorded in non-transitory computer-readable media. Here, the media may be continuously storing a program which may be executed with a computer, or temporarily storing for execution or download. Also, the media may be various recording means or storing means in a form of single or a plurality of hardware which are combined, but it is not limited to a media directly accessed to any computer system, and it may be distributed on network. Examples of the media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like, and may be configured to store program instructions. Also, examples of other media include app store distributing applications or recording media and storing media managed in sites, servers, and the like distributing other many software.

While certain example embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method performed in a computer system comprising:
   discovering a set of IoT (internet of things) resources for providing a set of services which is a set of functionalities necessary for a task in distributed IoT environments, wherein the discovering a set of IoT resources which discovers the set of IoT resources through a spatio-cohesive method considering spatial distance between a user and a service and between two services comprises:
generating a service discovery plan based on a plurality of spatio-cohesiveness requirements including a rule related to spatial distance, each of the plurality of spatio-cohesiveness requirements requiring that a distance between a user and a service or between two services should be within an upper limit;
determining a set of candidate IoT resources based on a number of spatio-cohesiveness requirements that are met by IoT resources among the plurality of spatio-cohesiveness requirements; and
discovering services necessary for the task based on the service discovery plan, but after discovering services meeting the plurality of spatio-cohesiveness requirements of the task, discovering other services maintaining spatio-cohesiveness with the discovered services; and
discovering a set of IoT resources that provide the services meeting the plurality of spatio-cohesiveness requirements of the task at an initial time, and handing over the set of IoT resources by (1) periodically checking whether the IoT resources selected for the task meet the plurality of spatio-cohesiveness requirements, and (2) converting IoT resources which do not meet the plurality of spatio-cohesiveness requirements to other IoT resources according to an objective function minimizing the number of hand-overs between (i) a first time that is after the initial time and (ii) a second time that is after the first time to minimize a hand-over cost, wherein the number of hand-overs is defined as a difference between the number of IoT resources selected for the task at the first time and the number of IoT resources selected for the task at the second time.

2. The method of claim 1, wherein the generating a service discovery plan comprises extracting specified spatio-cohesiveness requirements for the task from a predefined task template.

3. The method of claim 1, wherein the plurality of spatio-cohesiveness requirements are expressed based on ontology model and extracted by using a rule-based reasoning method.

4. The method of claim 1, wherein the generating a service discovery plan comprises instantiating the service discovery plan on a graph by using discovery strategies guiding traversal after the plurality of spatio-cohesiveness requirements are represented in the graph abstracting spatial positions and relationship of services.

5. The method of claim 4, wherein the discovery strategies are composed of a spanning tree algorithm for constructing a path for discovering a child service in a parent service and a service priority function for assigning a priority to each service based on their importance.

6. The method of claim 4, wherein the discovering a set of IoT resources comprises discovering IoT resources necessary to realize the services related to the task by propagating a service discovery request to the child service from the parent service according to the service discovery plan instantiated on the graph.

7. The method of claim 6, wherein the discovering IoT resources comprises selecting IoT resource with the closest spatial distance among candidate IoT resources after discovering the candidate IoT resources which provide the child service for the parent service.

8. The method of claim 1, wherein the discovering a set of IoT resources comprises selecting services necessary for the task based on a policy learned through machine learning for available services by dynamic changes of IoT environments.

9. The method of claim 8, wherein the policy is learned in a way of maximizing spatio-cohesiveness which is defined as a measure of how close spatial distance between the user and the service is and minimizing the number of hand-overs.

10. The method of claim 8, wherein the policy is implemented as neural networks inputting a state vector representing coordinates and speed of the user, a state vector representing coordinates and speed of the service, and a relationship vector representing relative position and speed between the user and the service.

11. A method performed in a computer system comprising:
discovering a set of IoT resources for providing a set of services which is a set of functionalities necessary for a task in distributed IoT environments,
wherein the discovering a set of IoT resources comprises:
extracting a plurality of spatio-cohesiveness requirements related to spatial distance between a user and a service and between two services;
generating a service discovery plan by instantiating on a graph by using discovery strategies guiding traversal after the plurality of spatio-cohesiveness requirements are represented in the graph abstracting spatial positions and relationship of services, each of the plurality of spatio-cohesiveness requirements requiring that a distance between a user and a service or between two services should be within an upper limit;
determining a set of candidate IoT resources based on a number of spatio-cohesiveness requirements that are met by IoT resources among the plurality of spatio-cohesiveness requirements; and
discovering IoT resources necessary to realize the services related to the task by propagating a service discovery request to a child service from a parent service according to the service discovery plan; and
discovering a set of IoT resources that provide the services meeting the plurality of spatio-cohesiveness requirements of the task at an initial time, and handing over the set of IoT resources by (1) periodically checking whether the IoT resources selected for the task meet the plurality of spatio-cohesiveness requirements, and (2) converting IoT resources which do not meet the plurality of spatio-cohesiveness requirements to other IoT resources according to an objective function minimizing the number of hand-overs between (i) a first time that is after the initial time and (ii) a second time that is after the first time to minimize a hand-over cost, wherein the number of hand-overs is defined as a difference between the number of IoT resources selected for the task at the first time and the number of IoT resources selected for the task at the second time.

12. A computer system comprises:
at least one processor implemented to execute computer readable instructions,
wherein the at least one processor processes a process for discovering a set of IoT resources for providing a set of services which is a set of functionalities necessary for a task in distributed IoT environments,
wherein the process for discovering a set of IoT resources which discovers the set of IoT resources through a spatio-cohesive method considering spatial distance between a user and a service, and between two services comprises:
- a process for generating a service discovery plan based on a plurality of spatio-cohesiveness requirements including a rule related to spatial distance, each of the plurality of spatio-cohesiveness requirements requiring that a distance between a user and a service or between two services should be within an upper limit,
- a process for determining a set of candidate IoT resources based on a number of spatio-cohesiveness requirements that are met by IoT resources among the plurality of spatio-cohesiveness requirements,
- a process for discovering services necessary for the task based on the service discovery plan, but after discovering services meeting the plurality of spatio-cohesiveness requirements of the task, discovering other services maintaining spatio-cohesiveness with the discovered services; and
- a process for discovering a set of IoT resources that provide the services meeting the plurality of spatio-cohesiveness requirements of the task at an initial time, and handing over the set of IoT resources by (1) periodically checking whether the IoT resources selected for the task meet the plurality of spatio-cohesiveness requirements, and (2) converting IoT resources which do not meet the plurality of spatio-cohesiveness requirements to other IoT resources according to an objective function minimizing the number of hand-overs between (i) a first time that is after the initial time and (ii) a second time that is after the first time to minimize a hand-over cost, wherein the number of hand-overs is defined as a difference between the number of IoT resources selected for the task at the first time and the number of IoT resources selected for the task at the second time.

13. The computer system of claim 12, wherein the process for generating a service discovery plan comprises a process for instantiating the service discovery plan on a graph by using discovery strategies guiding traversal after the plurality of spatio-cohesiveness requirements are represented in the graph abstracting spatial positions and relationship of services.

14. The computer system of claim 13, wherein the discovery strategies are composed of a spanning tree algorithm for constructing a path for discovering a child service in a parent service and a service priority function for assigning a priority to each service based on their importance.

15. The computer system of claim 13, wherein the process for discovering services necessary for the task comprises discovering IoT resources necessary to realize the services related to the task by propagating a service discovery request to the child service from the parent service according to the service discovery plan instantiated on the graph.

16. The computer system of claim 15, wherein the process for discovering IoT resources comprises selecting IoT resource with the closest spatial distance among candidate IoT resources after discovering the candidate IoT resources which provide the child service for the parent service.

17. The computer system of clam 12, wherein the process for discovering a set of IoT resources selects a service necessary for the task based on a policy learned through machine learning for available services by dynamic changes of IoT environments, wherein the policy is learned in a way of maximizing spatio-cohesiveness which is defined as a measure of how close spatial distance between the user and the service is and minimizing the number of hand-overs.

18. The method of claim 1, wherein the set of candidate IoT resources is determined based on a spatio-cohesiveness objective function indicating, for a particular set of IoT resources, a minimum distance between a user and a service and between two services, that causes failure to one of the plurality of spatio-cohesiveness requirements.

* * * * *